United States Patent [19]

Shu

[11] Patent Number: 4,903,766

[45] Date of Patent: Feb. 27, 1990

[54] SELECTIVE GEL SYSTEM FOR PERMEABILITY PROFILE CONTROL

[75] Inventor: Paul Shu, West Windsor, N.J.

[73] Assignee: Mobil Oil Corporation, New York, N.Y.

[21] Appl. No.: 292,127

[22] Filed: Dec. 30, 1988

[51] Int. Cl.⁴ .................... E21B 33/138; E21B 43/22; E21B 43/24

[52] U.S. Cl. .................................. 166/270; 166/272; 166/274; 166/295; 166/300; 523/130

[58] Field of Search ............... 166/270, 273, 274, 294, 166/295, 300; 405/264; 523/130

[56] References Cited

U.S. PATENT DOCUMENTS

| | | | |
|---|---|---|---|
| 3,918,521 | 11/1975 | Snavely, Jr. et al. | 166/272 |
| 4,479,894 | 10/1984 | Chen et al. | 252/8.55 D |
| 4,489,783 | 12/1984 | Shu | 166/272 |
| 4,513,821 | 4/1985 | Shu | 166/273 |
| 4,523,642 | 6/1985 | Venkatesan | 166/272 |
| 4,565,249 | 1/1986 | Pebdani et al. | 166/303 |
| 4,574,887 | 3/1986 | Abdo | 166/275 |
| 4,606,407 | 8/1986 | Shu | 166/270 |
| 4,716,966 | 1/1988 | Shu | 166/295 |
| 4,782,901 | 11/1988 | Phelps et al. | 166/270 |
| 4,785,028 | 11/1988 | Hoskin et al. | 166/295 X |
| 4,799,548 | 1/1989 | Mumallah et al. | 166/270 X |

Primary Examiner—George A. Suchfield
Attorney, Agent, or Firm—Alexander J. McKillop; Charles J. Speciale; Charles A. Malone

[57] ABSTRACT

An aqueous gel composition is formed from xanthan gum crosslinked with ions of a transitional metal, resorcinol, and formaldehyde. The gel which initially forms is injected into a formation where it selectively enters pores in a more permeable zone. Once in the more permeable zone, the gel reheals and forms a shear and thermally stable gel. This gel can be used in high temperature formations in addition to those formations having a pH of from about 3.0 to about 10. After the shear and thermally stable gel has formed, a steam-flooding, water-flooding, or a carbon dioxide oil recovery process is commenced in a zone of lesser permeability.

18 Claims, No Drawings

SELECTIVE GEL SYSTEM FOR PERMEABILITY PROFILE CONTROL

FIELD OF THE INVENTION

This invention relates to a process for recovering oil from a subterranean oil-containing formation. More particularly, this invention relates to a method of recovering oil wherein zones of varying permeabilities are treated with a selective gel which is thermally and shear stable.

BACKGROUND OF THE INVENTION

When hydrocarbon producing wells are drilled, initial hydrocarbon production is usually attained by natural drive mechanisms (water drive, solution gas, or gas cap, e.g.) which force the hydrocarbons into the producing wellbores. If a hydrocarbon reservoir lacks sufficient pore pressure (as imparted by natural drive), to allow natural pressure-driven production, artificial lift methods (pump or gas lift, e.g.) are used to produce the hydrocarbon.

As a large part of the reservoir energy may be spent during the initial (or "primary" production, it is frequently necessary to use secondary hydrocarbon production methods to produce the large quantities of hydrocarbons remaining in the reservoir. Waterflooding is a widespread technique for recovering additional hydrocarbon and usually involves an entire oil or gas field. Water is injected through certain injection wells selected based on a desired flood pattern and on lithology and geological deposition of the pay interval. Displaced oil is then produced into producing wells in the field.

Advancements in secondary hydrocarbon producing technology has led to several improvements in waterflood techniques. For example, the viscosity of the injected water can be increased using certain polymer viscosifiers (such as polyacrylamides, polysaccharides, and biopolymers) to improve the "sweep efficiency" of the injected fluid. This results in greater displacement of hydrocarbons from the reservoir.

Ability to displace oil from all the producing intervals in a hydrocarbon reservoir is limited by the lithological stratification of the reservoir. That is, there are variations in permeability which allow the higher permeability zones to be swept with injected fluid first and leave a major part of the hydrocarbon saturation in the lower permeability intervals in place. Continued injection of flooding fluid results in "breakthrough" at the producing wells at the high permeability intervals which renders continued injection of the flooding medium uneconomical.

Profile control has been used to prevent or correct "breakthrough" at high permeability intervals. Profile control involves blocking off the higher permeability intervals in a mature flood so that the flooding media is diverted to lower permeability intervals. A gel treatment can be used to reduce the permeability of a higher interval or zone and thereby improve the sweep efficiency. The treatment must be selective, otherwise, it will not be effective and may even be damaging if underswept zones are plugged. To avoid this, a mechanical packer can be used to treat each strata separately but this procedure is expensive and rather tedious.

Another approach is to use polymer gels having selective penetration properties which will preferably enter the high permeability zones. However, such a gel is very rare. Chromium crosslinked xanthan gum is selective, but it is limited to reservoirs with a maximum temperature of 140° F.

Another selective gel system is chromium crosslinked aminoresin stabilized xanthan gum disclosed in the U.S. Pat. No. 4,716,966. This patent is hereby incorporated by reference herein. This system is thermally stable up to 210° F. No known gel systems are both selective and stable at temperatures higher than 120° F. Resorcinol and formaldehyde are known to form brittle gels at a pH equal to or greater than 9 but such gels are brittle and lack selectivity. When the pH is about 9 or less a solid gel does not form. If a gel were to form it would be of poor quality.

Therefore, what is needed is a gel that can selectively enter pores in a formation's zone of greater permeability and subsequently reheal to form a shear and thermally stable gel where the temperature is greater than about 210° F. in a pH environment of from about 3 to about 10.

SUMMARY OF THE INVENTION

This invention is directed to an aqueous gellable composition and a method for using the composition to close pores in a formation's zone of greater permeability. The gellable composition comprises water, a xanthan gum, transitional metal ions, resorcinal, and formaldehyde. Polyvalent metal ions crosslink with the xanthan gum to form a shearable, selective gel which can be injected into a zone of higher permeability. Once the gel has entered the formation, it reheals. Heat from the formation causes the resorcinol and formaldehyde to crosslink with the xanthan gum and form a firm, solid gel which is thermally stable and shear resistant.

After the zone of higher permeability has been blocked by the gel, an enhanced oil recovery method is used to obtain hydrocarbonaceous fluids from a zone of lesser permeability. A variety of enhanced oil recovery methods can be utilized since the solid gel can withstand temperatures up to about 250° F. and endure formation conditions where the pH varies from about 3.0 to about 10.0 and the salinity can be as high as twenty two percent total dissolved solids.

It is therefore an object of this invention to provide for a multi-purpose gel which can selectively enter a formation's zone of greater permeability, reheal and thereafter form a solid gel which is both shear and thermally stable.

It is yet another object of this invention to provide for a resorcinol and formaldehyde crosslinked gel which can be used in subterranean formations where the pH varies from about 3.0 to about 10.0.

It is yet still another object of this invention to provide for a xanthan gum crosslinked with chromic ions, resorcinol, and formaldehyde so as to form a solid gel able to withstand formation temperatures up to about 250° F. and up to about twenty two percent salinity.

It is a still further object of this invention to provide for xanthan gel which will form within about 4–12 hours at room temperature with a typical xanthan/chromic ion crosslinked gel consistency which can be injected into a formation and form a final gel in-situ at higher temperatures.

PREFERRED EMBODIMENTS

In the practice of this invention, a gellable composition is made by mixing into water a water soluble xanthan polymer. Water which is suitable for use herein includes sea water, brackish water, fresh water, and mixtures thereof. Depending upon the formation's characteristics, xanthan gum is mixed into the aqueous solution in an amount of from about 0.1 to about 1.0 wt. %, preferably about 0.2 to about 0.5 wt. %.

Redox systems such as sodium dichromate and sodium bisulfite have been utilized to obtain $Cr^{+3}$ ions. Similar redox systems are described in U.S. Pat. No. 3,749,172 which is hereby incorporated by reference. When forming these gels, $Cr^{+3}$ ions are used in an amount of from about 20 to about 1,000 ppm, preferably about 50 to about 300 ppm. Water soluble $cr^{+3}$ salts such as chromic chloride, nitrate, sulfate, and organic complexed chromic salts used in leather tanning can also be used directly.

As is understood by those skilled in the art, the amount of $cr^{+3}$ ions, or other transition metal ions, utilized will vary depending upon the concentration and molecular weight of the particular polymer utilized.

A suitable amount of a phenolic compound is next added to the mixture. The phenolic compound utilized can comprise any suitable water-dispersible phenol or naphthol. Suitable phenols include monohydroxy and polyhydroxy naphthols. Phenolic compounds suitable for use in the present invention include phenol, catechol, resorcinol, phloroglucinol, phyrogallol, 4,4'-diphenol, 1,3-dihydroxynaphthalene, and the like. Other phenolic components that can be used include at least one member of selected oxidized phenolic materials of natural or synthetic origin such as 1,4-benzoquinone; hydroquinone or quinhydrone; as well as a natural or modified tannin such as quebracho or sulfomethylated quebracho. Resorcinol is the phenolic compound preferred for use herein in an amount of from about 0.25 to about 5.0 wt. %, preferably about 0.5 to about 3.0 wt. %. Other phenolic compounds can be employed in an amount comparable to that in molar concentration.

In the next step, an aldehyde is added to the mixture. Aldehydes which can be used herein include formaldehyde, polyoxymethylene, tetraoxane, trioxane, and dialdehydes. Dialdehydes which can be used include malonaldehyde, glutaldehyde, and other water soluble homologs. Aldehyde and dialdehyde should be included in the mixture in about 0.25 to about 5.0 wt. %. Formaldehyde is used in the mixture in about 0.5 to about 3.0 wt. %.

After the polymer has been mixed in the water, transition metal ions are added into the mixture. Suitable crosslinking agents include polyvalent metal cations such as $Al^{+3}$, $Cr^{+3}$, $Fe^{+3}$, $Sb^{+3}$ and $Zr^{+4}$. For example, aluminum citrate can be admixed into the mixture. Soluble compounds of $Cr^{+3}$ or $Fe^{+3}$ can be used, or oxidizable compounds of divalent iron such as $FeCl_2$ can be used in conjunction with an oxidant. $Cr^{+3}$ ions are particularly preferred. Chromic nitrate and chromic chloride can also be utilized. The mixing sequence is not limited to this order and said sequence can be reversed.

After mixing the components together, the gel time, viscosity, and strength can be controlled to the requirements of a reservoir and existing field conditions by the addition of a suitable acid or base. Any common inorganic acid such as sulfuric or hydrochloric acid can be used. Bases which can be utilized herein include the hydroxides of alkali metals such as potassium hydroxide, sodium hydroxide and calcium hydroxide. These and other bases are added to the mixture in an amount up to three times the concentration of the transitional metal ions employed in moles.

An initial gel if formed within about 4 to about 12 hours at room temperatures. The gel which is formed has a typical xanthan-chromium consistency. This initial gel is selective a more permeable zone of a formation. Once the injected gel has remained in the formation for a time sufficient to heat it, it forms a solid, heat and shear stable gel.

A preferred composition of the gel is mixed into 3.5–22 wt % synthetic seawater and includes the following components: (a) xanthan—0.2 to about 0.5 wt. %; (b) chromium (III) as $Cr^{+3}$—about 100 ppm by weight; (c) resorcinol—2.5 to about 1.0 wt. %; and (d) formaldehyde—about 0.5 wt. %. To this mixture is added a sufficient amount of acid or an alkali metal hydroxide or other base to obtain a desired gel time and gel strength.

The following Table illustrates the gel composition and gel time.

TABLE OF EXAMPLES

TABLE OF EXAMPLES

| No. | Xanthan[1] Wt. % | Cr(III) Wt. % | Resorcinol Wt. % | Formaldehyde Wt. % | NaOH Wt. % | Gel Time Hr. | Brine TDS Wt. % |
|---|---|---|---|---|---|---|---|
| 1 | 0.2 | 0.01 | 1 | 1 | 0 | 16 | 12 |
| 2 | 0.2 | 0.01 | 1 | 1 | 0.002 | 14 | 12 |
| 3 | 0.2 | 0.01 | 1 | 1 | 0.004 | 12 | 12 |
| 4 | 0.2 | 0.01 | 1 | 1 | 0.006 | 10 | 12 |
| 5 | 0.2 | 0.01 | 1 | 1 | 0.01 | 8 | 12 |
| 6 | 0.2 | 0.01 | 0.5 | 0.5 | 0 | NA | 3.5 |
| 7 | 0.2 | 0.01 | 0.5 | 0.75 | 0 | NA | 3.5 |
| 8 | 0.2 | 0.01 | 1 | 1.5 | 0 | NA | 3.5 |
| 9 | 0.2 | 0.01 | 1.5 | 1.5 | 0 | NA | 3.5 |
| 10 | 0.2 | 0.01 | 1.5 | 0.75 | 0 | NA | 3.5 |
| 11 | 0.2 | 0.01 | 2 | 1 | 0 | NA | 3.5 |
| 12 | 0.2 | 0.01 | 2 | 1.5 | 0 | NA | 3.5 |
| 13 | 0.2 | 0.01 | 2 | 2 | 0 | NA | 3.5 |

Examples 1–5 demonstrate the gel time control by adding NaOH.
Examples 7–13 demonstrate the variation of resorcinol and formaldehyde compositions.
Using the composition of Example 1 gels were also prepared in brines of 22 wt. %, 20 wt. %, 18 wt. %, 15 wt. % and 11 wt. %.
Shear stability was demonstrated by using no. 1 example sheared for 2, 4, 6, 8 minutes with a Waring blender at top speed to liquids from which final gel were formed at 250° F.
All examples gave firm gel at higher temperatures to yield the final gel.
[1]Pfizer's Flocon 4800C Xanthan biopolymer.

In the practice of this invention, a xanthan gum biopolymer is used to make a gel of the preferred composition above mentioned. The xanthan gum biopolymer utilized comprises a product purchased from the Pfizer Co. and sold under the FLOCON ® trademark. Xanthan gum, chromic nitrate, resorcinol, and formaldehyde are mixed into 6 wt. % seawater in accordance with the preferred composition. By adding a sufficient amount of sodium hydroxide, a gel composition is obtained which forms a gel within a desired time. It also possesses the desired gel strength for injecting into a more permeable zone of a formation. An initial gel is allowed to form at ambient temperatures. By ambient temperatures is meant a temperature of from about 40° F. to about 100° F. Upon obtaining the desired viscosity and strength, the gel is injected into at least one more permeable zone of a formation. The behavior of a Xanthomonas polysaccharide complex with trivalent metal ions is discussed in U.S. Pat. No. 4,574,887. This patent is incorporated herein by reference in its entirety.

The formation conditions into which the gel is injected may have a pH environment of from about 3.0 to about 10.0. The formation temperature can be from ambient to about 400° F. The final gel which forms can withstand these temperatures and pH ranges. Indeed, a formation temperature of about 100° to 400° F. allows the initial gel to from a firm, solid gel which is thermally and shear stable.

After the final thermally and shear stable gel has formed in a more permeable zone of the formation an enhanced oil recovery method is initiated in a less permeable zone so that hydrocarbonaceous fluids can be removed therefrom. The enhanced oil recovery method which is utilized can include for example, a carbon dioxide method, a waterflood, or a steam flood.

A carbon dioxide oil recovery method which can be used in a less permeable zone after closing a more permeable zone of a formation with the gel disclosed herein is disclosed in U.S. Pat. No. 4,523,642 which issued to Venkatesan on June 18, 1985. This patent is hereby incorporated by reference herein in its entirety.

A waterflooding method which can be used in a zone of lesser permeability after closing a more permeable zone of a formation with this novel gel is described in U.S. Pat. No. 4,479,984 which issued to Chen et al. This patent is hereby incorporated by reference herein in its entirety.

Steamflood methods which can be utilized when employing the novel polymer gels described herein are detailed in U.S. Pat. Nos. 4,489,783 and 3,918,521 issued to Shu and Snavely, respectively. These patents are hereby incorporated by reference herein.

The novel polymer gels described herein can also be used in conjunction with a cyclic carbon dioxide steam stimulation in a heavy oil recovery method to obtain greater sweep efficiency. Cyclic carbon dioxide steam stimulation can be commenced after plugging the more permeable zones of the reservoir with the aforedescribed novel polymer gels. A suitable method is described in U.S. Pat. No. 4,565,249 which issued to Pebdani et al. This patent is hereby incorporated by reference in its entirety. Increased sweep efficiency can be obtained when the subject gels are used in combination with a carbon dioxide process by lowering the carbon dioxide minimum miscibility pressure ("MMP") and recovering oil. Prior to commencement of the carbon dioxide method, the more permeable zones are plugged with the disclosed novel polymer gels. Carbon dioxide MMP in an oil recovery method is described in U.S. Pat. No. 4,513,821 issued to Shu. This patent is hereby incorporated by reference.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. A process for closing pores in a more permeable zone of a formation comprising:
    (a) placing into an aqueous solution a first composition sufficient to form ex-situ a size selective, shear thinning first gel which comprises
        (i) a xanthan biopolymer, and
        (ii) a transitional metal ion;
    (b) placing into said aqueous solution a second composition sufficient to form thermally a second in-situ gel which is substantially more resistant to formation conditions than said first gel which composition comprises
        (i) an aldehyde, and
        (ii) a phenolic compound;
    (c) allowing said aqueous solution sufficient time to form the ex-situ gel; and
    (d) injecting said aqueous solution containing said gel into said permeable zone where it reheals, is heated by the formation and thereafter forms a solid gel substantially more resistant to formation conditions than said first gel.

2. The process as recited in claim 1 where after the gellable composition has formed a solid gel, an enhanced oil recovery method is initiated and hydrocarbonaceous fluids are recovered from a less permeable zone of said formation.

3. The process as recited in claim 1 where after the gellable composition has formed a solid gel, an enhanced oil recovery method selected from the group consisting of a water flood, a carbon dioxide recovery method, or a steam flood is initiated in a less permeable zone and hydrocarbonaceous fluids are recovered.

4. The process as recited in claim 1 where the formation has a temperature of up to about 400° F.

5. The process as recited in claim 1 where an alkali metal hydroxide is added to said composition prior to injecting it into the formation in an amount of up to about three times the amount of the transitional metal compound utilized.

6. The process as recited in claim 1 where the pH environment of the formation wherein the composition is utilized is from about 3.0 to about 10.0.

7. The process as recited in claim 1 where the water comprises fresh water, salt water or brackish water.

8. The process as recited in claim 1 where an initial gel is formed within about 4 to about 12 hours at a temperature of about 40° to about 100° F. and the gel is injected into the formation where it forms a final gel at a temperature of about 100° to about 400° F.

9. The process as recited in claim 1 wherein said aqueous solution contains
    (i) about 0.1 to about 1.0 wt. % of a xanthan biopolymer;
    (ii) about 20 to about 1,000 ppm of transitional metal ions;
    (iii) about 0.25 to about 5 wt. % of resorcinol; and
    (iv) about 0.5 to about 3 wt. % of formaldehyde.

10. The process as recited in claim 1 where the aqueous solution is about 3.5 to about 22 wt. % synthetic seawater containing (i) about 0.2 to about 0.5 wt. % of a xanthan biopolymer;
(ii) about 100 ppm $Cr^{+3}$ ions by weight;
(iii) about 2.5 to about 1.0 wt. % resorcinol;
(iv) about 0.5 wt. % formaldehyde; and
(v) a sufficient amount of an inorganic acid or alkali metal hydroxide to obtain a desired gel time and gel strength.

11. A process for closing pores in a more permeable zone of a formation comprising:
   (a) placing into an aqueous solution a first composition sufficient to form ex-situ a size selective, shear thinning first gel which comprises
      (i) about 0.1 to about 1.0 wt. % of a xanthan biopolymer, and
      (ii) about 20 to about 1,000 ppm of a transitional metal ion and mixtures of transitional metal ions;
   (b) placing into said aqueous solution a second composition sufficient to form thermally a second in-situ gel which is substantially more resistant to formation conditions than said first gel which composition comprises
      (i) about 0.25 to about 5 wt. % of resorcinol, and
      (ii) about 0.5 to about 3 wt. % of formaldehyde;
   (c) allowing said aqueous solution sufficient time to form the ex-situ gel; and
   (d) injecting said aqueous solution containing said gel into said permeable zone where it reheals, is heated by the formation and thereafter forms a solid gel substantially more resistant to formation conditions than said first gel.

12. The process as recited in claim 11 where after the gellable composition has formed a solid gel, an enhanced oil recovery method selected from the group consisting of a water flood, a carbon dioxide recovery method, or a steam flood is initiated in a less permeable zone and hydrocarbonaceous fluids are recovered.

13. The process as recited in claim 11, where the formation has a temperature of up to about 400° F.

14. The process as recited in claim 11 where an alkali metal hydroxide is added to said composition prior to injecting it into the formation in an amount of up to about three times the amount of a transitional metal compound utilized.

15. The process as recited in claim 11 wherein the pH environment of the formation wherein the composition is utilized is from about 3.0 to about 10.0.

16. The process as recited in claim 11 where the water comprises fresh water, salt water or brackish water.

17. The process as recited in claim 11 where an initial gel is formed within about 4 to about 12 hours at a temperature of about 40° to about 100° F. and the gel is injected into the formation where it forms a final gel at a temperature of about 100° to about 400° F.

18. The process as recited in claim 11 where the aqueous solution is about 3.5 to about 22 wt. % synthetic seawater containing
   (i) about 0.2 to about 0.5 wt. % of a xanthan biopolymer;
   (ii) about 100 ppm $Cr^{+3}$ ions by weight;
   (iii) about 0.5 to about 1.0 wt. % resorcinol;
   (iv) about 0.5 wt. % formaldehyde; and
   (v) a sufficient amount of an inorganic acid or alkali metal hydroxide to obtain a desired gel time and gel strength.

* * * * *